No. 893,558. PATENTED JULY 14, 1908.
H. D. WILLIAMS.
VARIABLE SPEED TRANSMISSION GEAR.
APPLICATION FILED JULY 23, 1906.

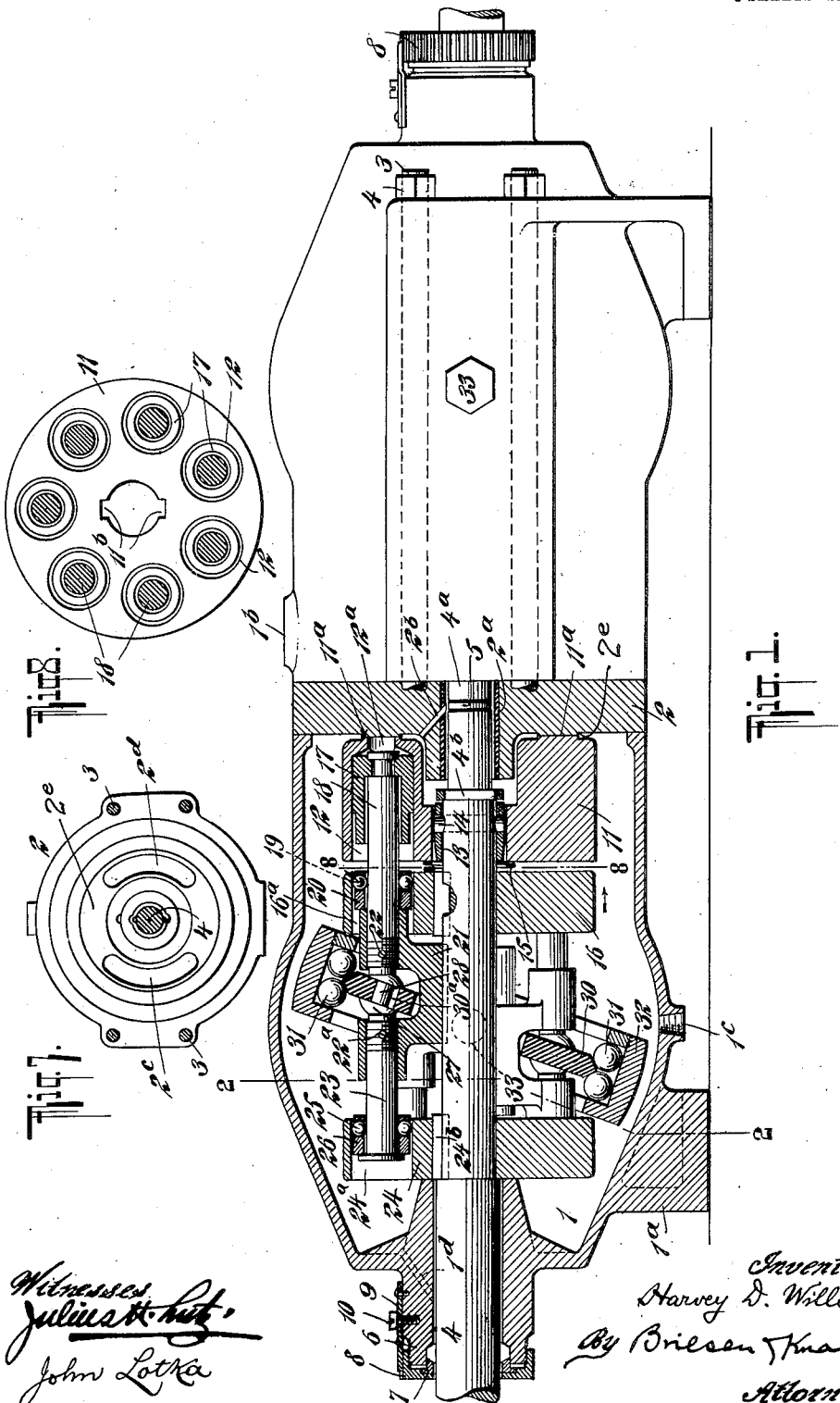

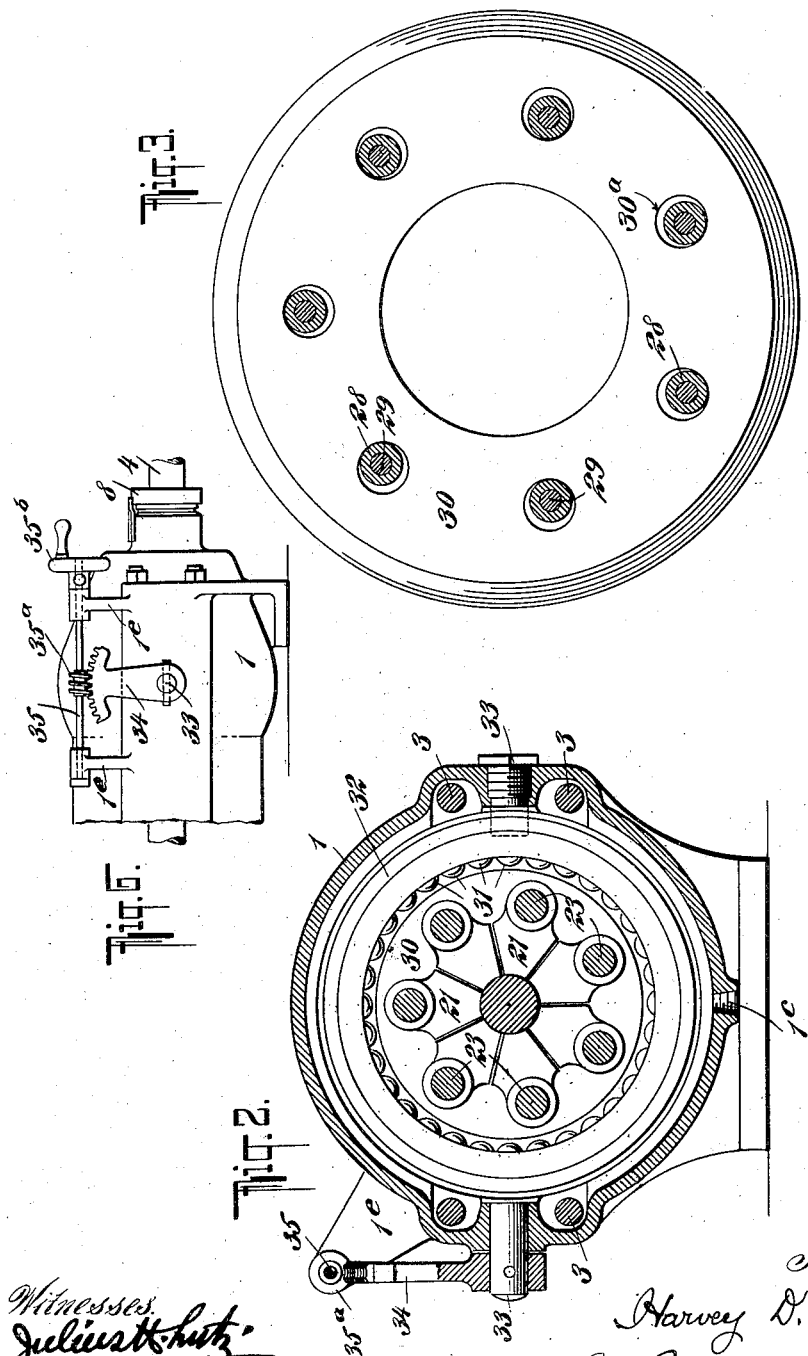

3 SHEETS—SHEET 3.

Witnesses
Julius H. Hutz
John Lotka

Inventor
H. D. Williams
By Briesen & Knauth
Attorneys.

UNITED STATES PATENT OFFICE.

HARVEY D. WILLIAMS, OF WASHINGTON, DISTRICT OF COLUMBIA, ASSIGNOR TO THE WATERBURY TOOL COMPANY, OF WATERBURY, CONNECTICUT, A CORPORATION OF CONNECTICUT.

VARIABLE-SPEED TRANSMISSION-GEAR.

No. 893,558.        Specification of Letters Patent.        Patented July 14, 1908.

Application filed July 23, 1906. Serial No. 327,285.

*To all whom it may concern:*

Be it known that I, HARVEY D. WILLIAMS, a citizen of the United States, and a resident of Washington, District of Columbia, have invented certain new and useful Improvements in Variable-Speed Transmission-Gear, of which the following is a specification.

My invention relates to pumps and fluid motors adjustable in speed, and to a combination of pump and fluid motor which constitutes a variable speed transmission gear.

The object of my invention is to improve those devices of the above indicated class in which a rotary cylinder barrel is employed with pistons moving lengthwise of the axis of rotation and with an inclined rotary member connected with said pistons. In practice difficulties have arisen as regards securing a uniform action of the apparatus, and my present invention relates to a simple construction for overcoming these difficulties.

Figure 5:
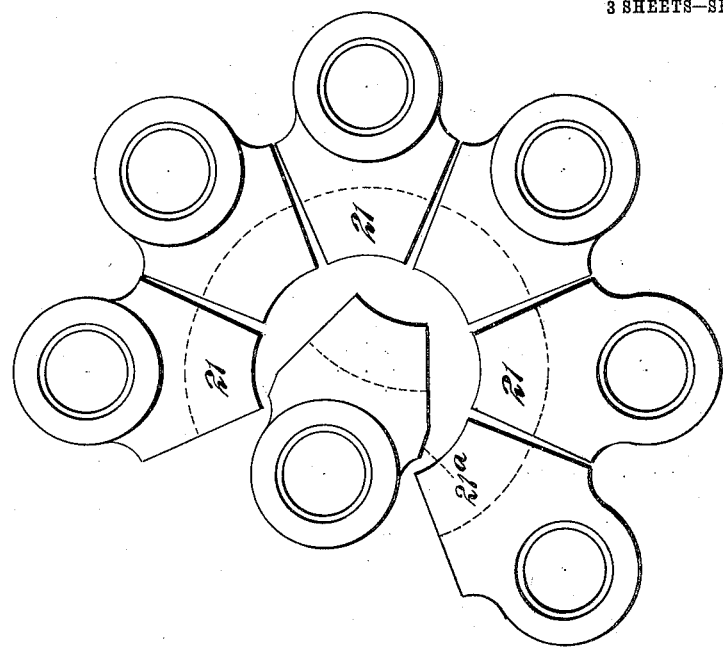
Figure 4:
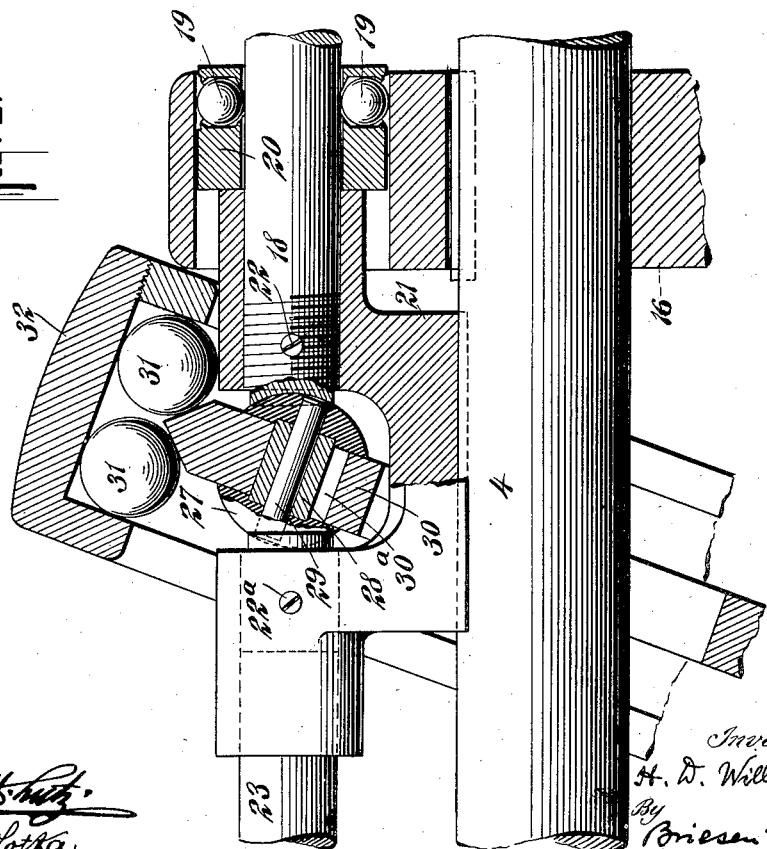

A variable speed gear embodying my invention is illustrated in the accompanying drawings, in which Figure 1 is partly a longitudinal section and partly a side elevation of the complete machine; Fig. 2 is a cross section, substantially on line 2—2 of Fig. 1, but drawn under the assumption that the inclined rotary member has been shifted to a position perpendicular to the shaft; Fig. 3 is a face view of said member with certain connecting devices; Fig. 4 shows in detail the shaft, the inclined rotary member, and their connections with the pistons and with the adjustable tilting box; Fig. 5 illustrates the possibility of assembling the yokes connected with the pistons, through the central opening of the inclined member; Fig. 6 is a side elevation of one half of the machine with one form of mechanism for adjusting the tilting box; Fig. 7 is a face view of the midplate and Fig. 8 is a cross section on line 8—8 of Fig. 1, on a reduced scale.
The machine shown in the drawings comprises two shell sections, 1, resting on feet $1^a$ and engaging a midplate 2 placed between them. These three parts are held together by any suitable means, such as tie bolts 3 and nuts 4. The machine may be filled with oil through an opening $1^b$, and emptied when desired through a drain hole $1^c$, normally closed by a plug.

4 and $4^a$ are the driving shaft and the driven shaft respectively, projecting through the shells 1 and into the mid-plate 2, which may contain a bushing $2^a$ and a fiber disk 5 interposed between the shaft ends to take up end thrust. Lubricating channels $1^d$ and $2^b$ serve to distribute oil to the outer and inner portions of the shafts. At the end of each shell, I arrange a stuffing box 6, with a packing ring 7 and a screw cap 8, which after adjustment is locked by a keeper 9 engaging corrugations on the cap. The keeper is secured by screws 10. The mid-plate 2 is provided with two ports $2^c$ and $2^d$, through which the fluid passes in opposite directions during the operation of the machine. The orifices of these ports are preferably arranged in annular portions $2^e$ projected from the mid-plate.

The two sections of the machine, on opposite sides of the mid-plate, may be exactly alike, and it will therefore be sufficient to describe one of them. On the shaft 4 is mounted a barrel 11 having cylinders 12 disposed lengthwise thereof and an annular portion $11^a$ corresponding to the portion $2^e$ of the mid-plate. It is sufficient, however, to have such an annular projection on one of said parts, either the mid-plate or the cylinder barrel. Each cylinder 12 has a port $12^a$ in the projection $11^a$, and these ports which are smaller than the cylinder bore, are adapted to come into and out of communication with the ports $2^c$ and $2^d$ of the stationary member or mid-plate as the barrel 11 rotates. The barrel has two longitudinal key-ways $11^b$ adapted to receive keys 13 held by a pin 14 driven through the shaft. The ends of the keys 13 are beveled, so that the barrel may not only move lengthwise of the shaft, but may rock slightly on the ends of the pin 14.
The port surface of the barrel will thus snugly fit the port surface of the mid-plate, under the influence of a spring 15, pressing the barrel toward the mid-plate. The spring finds its backing or bearing point on a guide sleeve 16, keyed rigidly to the shaft 4. A collar $4^b$ may be screwed on the shaft 4 to keep the barrel 11 connected therewith when the machine is taken apart.

Within each of the cylinders 12 is mounted to reciprocate a piston 17, with which is connected loosely a piston rod 18. The looseness should permit of a slight side motion of the rod relatively to the piston, but a tight joint should be formed between piston and piston rod so that no leakage may occur when the piston is on its pressure stroke (moving toward the mid-plate). The piston rods 18 pass through apertures 16ª of the guide sleeve and in engagement with balls 19 held in cages 20, these balls serving to guide the piston rods and to take up any side thrust. The cages 20 may or may not have lengthwise movement in the apertures 16ª; the drawing shows them movable, the balls engaging the walls of the apertures and the piston rods as well, so that each cage will travel lengthwise a distance approximately equal to one-half the piston stroke. The outer end of each piston rod is secured to a yoke 21 mounted to slide on the shaft 4. The piston rod may, for instance, be screwed into the yoke and then locked by a set screw 22. The yokes 21 are set loosely around the shaft, and their position is governed by that of the respective pistons 17. The outer member of each yoke receives one end of a brace rod 23, which may be screwed in and held by a set screw 22ª, in the same manner as the outer end of the piston rod. There is a brace rod 23 in alinement with each of the piston rods, and the outer end of each brace rod passes through one of a series of apertures 24ª in a guide sleeve 24, secured rigidly to the shaft 4 by a key 24ᵇ or in any other suitable manner. Balls 25 and a movable cage 26 are provided at this point also, corresponding to the structure described in connection with the guide sleeve 16.

The adjacent ends of the rods 18 and 23 are concaved spherically to fit the corresponding surfaces of ball segments 27 which are separated by a distance sleeve 28 and held together by a rivet 29 or equivalent means. Each sleeve 28 passes loosely through an aperture 30ª in the inclined rotary member or swash-plate 30, said aperture being sufficiently larger than the sleeve to allow of the relative movement required by the adjustment of the device and by the peculiar movement of the swash-plate. This plate has its tapered edge supported on two rows of bearing balls 31 running in a tilting box 32, fulcrumed on the shell 1 by means of trunnions 33 which are horizontal when, as shown, the line of division between the mid-plate ports 2ᶜ and 2ᵈ is vertical or approximately so. Any suitable means may be employed for holding the tilting box 32 steady and for adjusting its inclinations; in Figs. 2 and 6, I have indicated a toothed sector arm 34 secured to one of the trunnions 33, which trunnion is rigid with the tilting box. The teeth of the sector are engaged by a worm 35ª on a shaft 35 journaled in suitable brackets 1ᵉ and adapted to be operated by means of a hand-wheel 35ᵇ.

In operation, as the shaft 4 is rotated, the barrel 11 and the guide sleeves 16, 24 revolve with the shaft. If the tilting member 32 and the swash-plate 30 stand perpendicular to the shaft, the pistons 17 will simply be carried along by the barrel 11, without any reciprocating motion. As soon, however, as the swash-plate is inclined, as shown in Figs. 1 and 4, the engagement of the adjacent ends of the rods 18, 23 with the balls 27 carried by the swash-plate or inclined rotary member 30 will cause the pistons 17 to reciprocate in their cylinders 12, so that the oil or other liquid contained in the cylinders will be forced into the cylinders of the barrel on the other side of the mid-plate 2. The pistons on the driven end of the machine will thus be subjected to pressure which being exerted against an inclined member (the ball-bearing 31 and box 32) will cause the barrel on the driven end of the machine to rotate in one direction or the other, depending on the inclination of the tilting box 32 at the driven end. The oil will pass to the driven section through one of the mid-plate ports (2ᶜ or 2ᵈ) and will return to the driving section through the other mid-plate port.

During the rotation of the barrel the center of the ball formed by the segments 27 will remain at a constant distance from the axis of the shaft, since said segments are held between the concave ends of the rods 18, 23. When the inclination of the swash-plate is adjusted, the center of the ball is moved, more or less, away from the center of the swash-plate, hence the necessity for giving the sleeve 28 some play. The peculiar motion of the swash-plate when inclined, also renders the provision of such play necessary, even when no adjustment of the inclination is contemplated. Fig. 3 shows the position of the several sleeves when the swash-plate is inclined at an angle of 20°.

The yokes 21 slide back and forth on the shaft, following the motion of the pistons 17. In assembling the machine one end of the yoke is passed through the central opening of the swash-plate 30, and the yoke is then moved outward to its intended position. Fig. 5 shows all the yokes except one, in their final position, and the last yoke in the central or inserting position. The corners of this yoke are cut off, as at 21ª, so that it may be shifted outward through the gap left between the other yokes. The shaft 4 (or 4ª) is then inserted. The inner ends of the yokes are concaved to fit the shaft. If desired, all the yokes might be made alike, with the corners cut off.

The two sections of the apparatus being alike, either one of them may be used as the driving section. If desired, the inclined box 32 of one section may be fixed at a constant angle instead of being pivoted for adjustment.

Each of the sections may be considered as a pump or as a motor, being capable of either function, and each section is perfectly operative by itself. Thus all the parts shown to the right of the mid-plate 2 in Fig. 1 might be omitted, and the remaining portion of the apparatus could be used as a pump, one of the mid-plate ports serving as a suction port and the other as a delivery port; or by admitting a fluid under pressure through one of the midplate ports, and allowing it to pass out through the other, the apparatus could be used as a motor. In fact, the machine shown in Fig. 1 may be considered a combination of a pump (left-hand section) with a motor (right-hand section).

I claim,

1. The combination of a stationary member having ports for the passage of the fluid, a rotary barrel having cylinders with ports adapted to communicate with those of the stationary member, pistons mounted to reciprocate within said cylinders, an inclined rotary member, and connections, permanently parallel with the barrel's axis of rotation, extending from the pistons to said inclined member.

2. The combination of a stationary member having ports for the passage of the fluid, a rotary barrel having cylinders with ports adapted to communicate with those of the stationary member, pistons mounted to reciprocate within said cylinders, an inclined rotary member, balls mounted on said inclined member, reciprocating yokes embracing said balls, piston rods secured to the pistons and to the yokes and engaging the balls on one side, and bracing rods secured to the yokes and engaging the balls on the other side.

3. The combination of a stationary member having ports for the passage of the fluid, a rotary barrel having cylinders with ports adapted to communicate with those of the stationary member, pistons mounted to reciprocate within said cylinders, an inclined rotary member, balls mounted on said inclined member, and piston rods connected with said pistons and engaging said balls.

4. The combination of a stationary member having ports for the passage of the fluid, a rotary barrel having cylinders with ports adapted to communicate with those of the stationary member, pistons mounted to reciprocate within said cylinders, an inclined rotary member, balls mounted on said inclined member, rods connected with said pistons and engaging said balls, and bracing rods connected with the piston rods and engaging the balls on the other side.

5. The combination of a stationary member having ports for the passage of the fluid, a rotary barrel having cylinders with ports adapted to communicate with those of the stationary member, pistons mounted to reciprocate within said cylinders, an inclined rotary member, a guide member located on the side of this inclined member opposite to the barrel and held to rotate with the barrel, balls on the inclined member, rods connected with the pistons and engaging said balls on one side, and brace rods held to reciprocate in said guide members, in unison with the pistons, and arranged to engage said balls on the other side.

6. The combination of a stationary member having ports for the passage of the fluid, a shaft, a barrel held to rotate with the shaft and having cylinders with ports adapted to communicate with those of the stationary member, pistons within said cylinders, an inclined member, slides mounted to move lengthwise on the shaft, and piston rods extending from the pistons to the said inclined member and secured to said slides.

7. The combination of a stationary member having ports for the passage of the fluid, a rotary barrel having cylinders with ports adapted to communicate with those of the stationary member, pistons mounted to reciprocate within said cylinders, an inclined rotary member, a guide member located between the inclined member and the barrel and held to rotate with both of them, rods extending from the piston to the inclined member, and ball bearings engaging said rods and the guide member.

8. The combination of a stationary member having ports for the passage of the fluid, a shaft, a barrel held to rotate with the shaft and having cylinders with ports adapted to communicate with those of the stationary member, pistons within said cylinders, an inclined rotary member, a guide member located between the barrel and said inclined member and held to rotate with the shaft, rods connected with the pistons loosely and having an engagement with said inclined member, and bearing balls engaging the said rods and the guide member to take up lateral strains.

9. The combination of a stationary member having ports for the passage of the fluid, a shaft, a barrel held to rotate with the shaft and having cylinders with ports adapted to communicate with those of the stationary member, pistons within said cylinders, an inclined rotary member, a guide member located between the barrel and said inclined member and held to rotate with the shaft, rods connected with the pistons and with the inclined member and extending through the guide member, another guide member, likewise held to rotate with the shaft, but located on the opposite side of the inclined member, and brace rods, connected with the piston rods, and in engagement both with the second-named guide member and with the inclined member.

10. The combination of a stationary member having ports for the passage of the fluid, a shaft, a barrel held to rotate with the shaft and having cylinders with ports adapted to communicate with those of the stationary member, pistons within said cylinders, an inclined rotary member, a series of individual yokes mounted to slide on the shaft and each embracing the said inclined member, two guide members, held to turn with the shaft, between which said yokes are located, a rod extending from each of the pistons through one of the guide members and one member of a yoke to an engagement with the inclined member, and reciprocating brace rods, each in alinement with one of the piston rods, passing from the other guide member through the other members of the yokes and into engagement with the inclined member.

11. The combination of a stationary member having ports for the passage of the fluid, two rotary barrels having cylinders with ports adapted to communicate with those of the stationary member, pistons in said cylinders, inclined rotary members, connections, permanently parallel with the axes of rotation of the respective barrels, extending from the pistons to the respective inclined members, and a tilting bearing for varying the inclination of one of said inclined rotary members.

12. The combination of a stationary member having ports for the passage of the fluid, a rotary barrel having cylinders with ports adapted to communicate with those of the stationary member, pistons mounted to reciprocate within said cylinders, an inclined rotary member, a tilting bearing for varying the inclination of said inclined rotary member, and connections, permanently parallel with the barrel's axis of rotation, extending from the pistons to said inclined member.

In testimony whereof, I have hereunto set my hand in the presence of two subscribing witnesses.

HARVEY D. WILLIAMS.

Witnesses:
 CHAS. R. BURR,
 R. R. BRIGHT.